United States Patent Office 2,836,624
Patented May 27, 1958

2,836,624

3,4-DIHYDRO - 2-(3',4'-DIHYDRO - 6' - METHOXY-1'-NAPHTHYL)-6-METHOXY - 1(2) - NAPHTHALENONE AND PROCESS OF PREPARATION

Robert E. Gentry, Jr., Pleasant Hills, Calif., and Robert R. Burtner, Skokie, Ill., assignors to G. D. Searle & Co., Chicago, Ill., a corporation of Delaware No Drawing. Application February 25, 1957
Serial No. 642,317

2 Claims. (Cl. 260—590)

This invention relates to alkoxytetralone condensation products and processes useful because of the valuable pharmacological properties deriving therefrom. More particularly, this invention relates to compounds of the formula

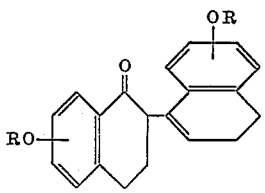

wherein R is a lower alkyl radical. Among the lower alkyl radicals comprehended by R in the foregoing formula, methyl, ethyl, propyl, isopropyl, butyl, isobutyl, sec-butyl, tert-butyl, pentyl, isopentyl, tert-pentyl, neopentyl, hexyl, isohexyl, heptyl, and octyl radicals are preferred; and these are optimally situate in the 6,6' position of the aromatic nuclei, although 5,5', 7,7', and 8,8' alkoxylated condensation products of tetralone are also considered desirable for the purposes of the present invention.

As an example of the useful physiological activity which distinguishes the subject compositions, it has been found that especially 3,4-dihydro-2-(3',4'-dihydro-6'-methoxy-1'-naphthyl)-6-methoxy-1(2)-naphthalenone and congeners are potent anti-androgenic agents: they inhibit the hormonal effect of such substances as testosterone on secondary sex characteristics.

The compounds to which this invention relates are produced by intermolecular condensation of an appropriate alkoxytetralone, in solvent medium, under the influence of strong acid or a base. In the preferred process of manufacture, an alkoxytetralone of choice—especially, 6-methoxy-α-tetralone—is heated at temperatures ranging from 80 to 160° centigrade in the presence of aluminum tert-butoxide, using an anhydrous, inert, non-polar, hydrocarbon solvent—for example, benzene, toluene, xylene, or the like—as a reaction medium, and with tert-butyl alcohol formed in process being removed by distillation.

The following examples describe in detail a product representative of those herein disclosed, and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

A mixture of 70 parts of 6-methoxy-α-tetralone, 230 parts of ethylene glycol, 425 parts of toluene, and 1 part of p-toluenesulfonic acid is heated at the boiling point under reflux for approximately 37 hours, water being removed as formed in process. The mixture is cooled, and the toluene phase is then removed and successively washed with aqueous sodium bicarbonate and water. Solvent is evaporated, following which the residue is distilled in vacuo, to recover unchanged starting material. The distillation residue is taken up in acetone and allowed to stand at 0–5° C. for approximately 48 hours. A yellow precipitate forms, which is collected on a filter and recrystallized from methanol to afford pure 3,4-dihydro-2-(3',4'-dihydro-6'-methoxy-1'-naphthyl) - 6 - methoxy-1(2)-naphthalenone melting at 124–236° C. The product has the formula

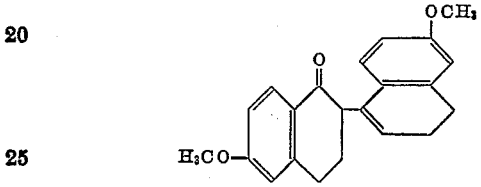

*Example 2*

A mixture of approximately 18 parts of 6-methoxy-α-tetralone, 1 part of sodium methoxide, and 120 parts of dry toluene is heated with agitation at the boiling point under reflux in a nitrogen atmosphere for 21 hours. Sodium methoxide is thereupon neutralized by incorporation of 2 parts of acetic acid, following which approximately 200 parts of water is introduced. The toluene phase is separated, washed with water, and finally stripped of solvent by evaporation under reduced pressure. Vacuum distillation at 0.1 mm. of mercury affords a substantial quantity of unreacted tetralone plus a dark red, glassy residue which is dissolved in approximately 40 parts of boiling ethanol. The resultant solution is stored at room temperatures for 24 hours. A crystalline solid forms which, freed of supernatant liquid by decantation, is then recrystallized from methanol containing decolorizing charcoal, to give pearly white plates of 3,4-dihydro-2-(3',4'-dihydro-6'-methoxy-1'-naphthyl) - 6 - methoxy-1(2)-naphthalenone, melting at 123–125° C.

*Example 3*

A solution of 88 parts of 6-methoxy-α-tetralone and 62 parts of aluminum tert-butoxide in 180 parts of dry xylene is heated at the boiling point of the solvent present under reflux for 2 hours with agitation. Reflux is carried out by means of a fractionating column so adjusted that xylene is continuously returned to the reaction kettle, while the tert-butyl alcohol formed in process is permitted to distill off. At the end of the prescribed reaction period, substantially 100% of the amount of tert-butyl alcohol theoretically derivable from the aluminum tert-butoxide present is recovered. The reactants are cooled to around 50° C. at this point, following which approximately 250 parts of saturated Rochelle salt solution is introduced and steam distillation effected to remove solvent. The distilland is thrice extracted with 200 parts of chloroform, whereupon solvent and residual water is removed from the combined extracts by evaporation at 90–100° C. under water pump vacuum. Addition of 140 parts of methanol to the oily residue thus obtained affords a voluminous buff-colored solid which, recrystallized from ethyl acetate containing decolorizing charcoal, is converted to pearly white leaflets of 3,4-dihydro-2-(3',4'-dihydro-6'- methoxy-1'-naphthyl)-6-methoxy-1(2)-naphthalenone, the melting point of which is 124–125° C.

What is claimed is:

1. 3,4-dihydro-2-(3',4'-dihydro-6'-methoxy-1'-napthyl)-6-methoxy-1(2)-naphthalenone.

2. In a process for the manufacture of 3,4-dihydro-2-(3',4'-dihydro-6'-methoxy-1'-naphthyl)-6-methoxy-1(2)-naphthalenone, the step which comprises heating 6-methoxy-α-tetralone at temperatures ranging from 80 to 160° C. in the presence of aluminum tert-butoxide, using an anhydrous, inert, non-polar, hydrocarbon solvent as a reaction medium, and with tert-butyl alcohol formed in process being removed by distillation.

No references cited.

UNITED STATES PATENT OFFICE

CERTIFICATE OF CORRECTION

Patent No. 2,836,624                                           May 27, 1958

Robert E. Gentry, Jr. et al.

It is hereby certified that error appears in the printed specification of the above numbered patent requiring correction and that the said Letters Patent should read as corrected below.

Column 2, line 17, "124–236° C." read -- 124–126° C. --.

Signed and sealed this 23rd day of September 1958.

(SEAL)
Attest:

KARL H. AXLINE                                           ROBERT C. WATSON
Attesting Officer                                         Commissioner of Patents